(12) United States Patent
Liedes

(10) Patent No.: US 8,666,981 B2
(45) Date of Patent: Mar. 4, 2014

(54) BOTTOM-UP OPTIMISTIC LATCHING METHOD FOR INDEX TREES

(75) Inventor: Antti-Pekka Liedes, Espoo (FI)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/036,708

(22) Filed: Feb. 28, 2011

(65) Prior Publication Data

US 2012/0221531 A1    Aug. 30, 2012

(51) Int. Cl.
*G06F 17/30* (2006.01)

(52) U.S. Cl.
USPC .......................................................... 707/736

(58) Field of Classification Search
USPC .............................. 707/100, 695, 736; 380/277
See application file for complete search history.

(56) References Cited

U.S. PATENT DOCUMENTS

| | | |
|---|---|---|
| 6,484,172 B1 | 11/2002 | Lee et al. |
| 6,578,026 B1 | 6/2003 | Cranston et al. |
| 6,631,386 B1 | 10/2003 | Arun et al. |
| 6,647,386 B2 | 11/2003 | Hollines, III et al. |
| 6,760,726 B1 | 7/2004 | Hersh |
| 7,072,904 B2 | 7/2006 | Najork et al. |
| 7,293,028 B2 | 11/2007 | Cha et al. |
| 7,577,658 B2 | 8/2009 | Graefe |
| RE40,989 E * | 11/2009 | Jain et al. ................................ 1/1 |
| 8,015,165 B2 * | 9/2011 | Idicula et al. .................. 707/695 |
| 8,045,713 B2 * | 10/2011 | Lain et al. ...................... 380/277 |
| 2008/0033952 A1 | 2/2008 | McKenney et al. |
| 2008/0065670 A1 | 3/2008 | Cha et al. |
| 2008/0071809 A1 * | 3/2008 | Lomet ............................ 707/100 |
| 2008/0313408 A1 | 12/2008 | Blumrich et al. |
| 2012/0221538 A1 | 8/2012 | Liedes |

FOREIGN PATENT DOCUMENTS

WO         02101557 A1    12/2002

OTHER PUBLICATIONS

Lanin et al., "A Symmetric Concurrent B-Tree Algorithm", IEEE, 1986, pp. 380-389.
Cha et al., "Cache-Conscious Concurrency Control of Main-Memory Indexes on Shared-Memory Multiprocessor Systems", Proceedings of the 27th BLDB Conference 2001, 10 pages.
Yehoshua Sagiv, "Concurrent Operations on B-Tree with Overtaking", ACM, 1985, pp. 28-37.
Cui Bin, "Indexing for Efficient Main Memory Processing", National University of Singapore, 2003, 208 pages.
Philip L. Lehman and S. Bing Yao "Efficient Locking for Concurrent Operations on B-Trees", ACM Transactions on Database Systems, vol. 6, No. 4, Dec. 1981, pp. 650-670.

* cited by examiner

*Primary Examiner* — Etienne Leroux
(74) *Attorney, Agent, or Firm* — Susan Murray; SVL IP Law Edell, Shapiro & Finnan, LLC

(57) ABSTRACT

Methods, systems and computer program products for concurrency control in a hierarchical arrangement of nodes of a data structure by traversing a single search path in a hierarchical arrangement of nodes of a data structure, recording a version number for each node in the search path, identifying at least one node in the search path to be updated, latching the at least one node, reading a version number of the latched at least one node and comparing the recorded version number of the latched at least one node to the read version number of the latched at least one node.

25 Claims, 2 Drawing Sheets

BOTTOM-UP OPTIMISTIC LATCHING METHOD FOR INDEX TREES

BACKGROUND OF THE INVENTION

1. Field of the Invention

The present invention relates to information management systems and more particularly to an optimistic version number based concurrency control for memory-resident index structures.

2. Description of the Related Art

Database systems use indexes for efficient access to specific data items. Different tree structures, such as B-trees and tries (radix trees) are a method of choice for the indexes. In order to provide safe access by multiple processors at the same time, index trees employ a concurrency control method to protect different parts of the tree from being read or written by a processor while another processor is writing to the same place at the same time.

Concurrency control is important for multiprocessor scalability of an index structure. Typically, concurrency control entails the use of latches to lock a part of the index tree, usually a single node, against reading, writing, or both. The best scalability is attained by concurrency control methods that have a minimum amount of latch collisions, i.e., the same latch being wanted by two or more processors at the same time.

An optimistic, latch-free index traversal ("OLFIT") scheme provides a method of protecting reads against simultaneous writes without latching a node. However, the OLFIT scheme only latches one node at a time when updating the tree, which means the OLFIT scheme must rely on the B-link method of node links when splitting nodes. This limits the applicability of the OLFIT scheme to B-link trees. Moreover, there is no method of joining two nodes. An index tree that requires latches on multiple levels for inserting or deleting a key can not benefit from the OLFIT scheme.

Therefore, there is a need for an optimistic latching method that can latch multiple levels of an index tree in database systems to allow the implementation of self-contained, one-go key insert and key delete.

BRIEF SUMMARY OF THE INVENTION

Embodiments of the present invention provide a method, system and computer program product for concurrency control in a hierarchical arrangement of nodes of a data structure by traversing a single search path in a hierarchical arrangement of nodes of a data structure, recording a version number for each node in the search path, identifying at least one node in the search path to be updated, latching the at least one node, reading a version number of the latched at least one node and comparing the recorded version number of the latched at least one node to the read version number of the latched at least one node.

A data processing system configured for concurrency control includes a host computer with processor and memory, a query processing system executing in the host computer and monitoring queries of a database in a main memory and a concurrency control module coupled to the query processing system, the concurrency control module including program code for traversing a single search path in a hierarchical arrangement of nodes of a data structure and recording a version number for each node in the search path, for identifying at least one node in the search path to be updated, for latching the at least one node, for reading a version number of the latched at least one node on the search path and for comparing the latched at least one node to the read version number of the latched at least one node.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to concurrency control in a hierarchical arrangement of nodes of a data structure and provide a novel and non-obvious method, system and computer program product for concurrency control in a hierarchical arrangement of nodes of a data structure.

Figure 1:
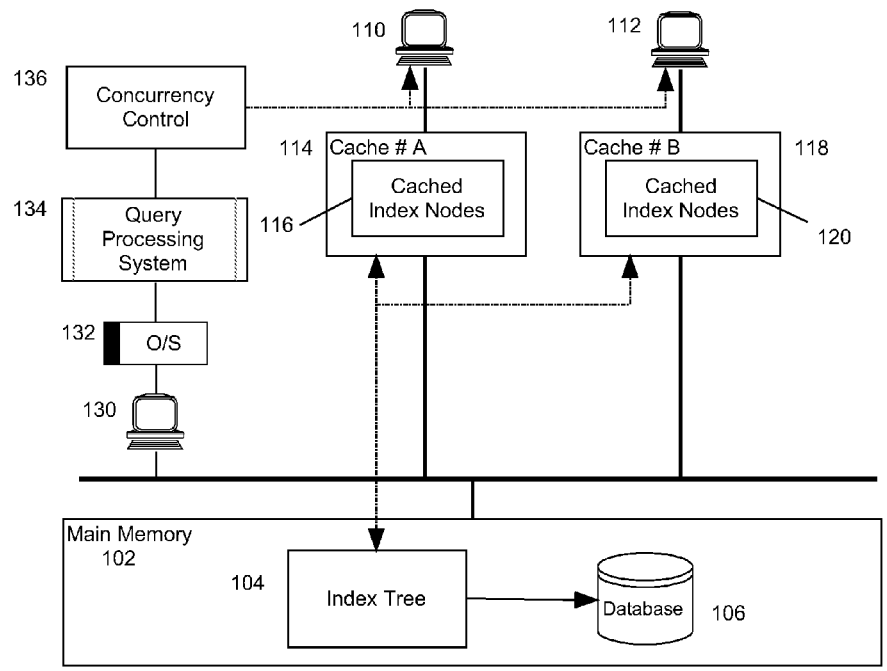
FIG. 1 is a data processing system configured for concurrency control in a hierarchical arrangement of nodes of a data structure.

In further illustration, FIG. 1 is a data processing system implementing an optimistic traversal scheme in accordance with the present invention, which takes advantage of the "optimistic" characteristic of database transactions in the sense that the majority of database transactions do not conflict. FIG. 1 schematically shows a data processing system configured for concurrency control in a tree data structure. The system can include a host computer 130 with at least one processor and memory. The host computer 130 can be configured for communicatively coupling to a main memory 102 over a data bus or communications network. The main memory 102 can include database 106 and an index structure 104, usually a tree, for efficiently managing the database 106. The host computer 130 can include an operating system 132 executing by one or more of the processors in the memory of the host computer 130. A query processing system 134, in turn, can be hosted by the operating system 132. The query processing system 134 can include functionality sufficient to direct queries of the index tree 104 and database 106 of main memory 102. In this embodiment, multiple processes are attempting to access main memory 102. For example, Cache #A 114 (or cache #B 118) is provided for processing element #A 110 (or processing element #B 112) to store frequently accessed index nodes 116 (or 120) so as to improve the overall memory access time performance.

Notably a concurrency control unit 136 can be coupled to the query processing system 134 and can execute in the memory by one or more of the processors of the host computer 130. In embodiments, concurrency control unit 136, preferably implemented in software, is provided to coordinate processing elements or threads so as to maintain the consistency of processing without too frequent invalidation of cache entries. In embodiments, the concurrency control unit 136 provides control necessary for latch-free traversal of index nodes based on optimistic index concurrency control. Concurrency control unit 136 further can include program code for traversing a single search path in a hierarchical arrangement of nodes of a data structure and recording a version number for each node in the search path, for identifying at least one node in the search path to be updated, for latching the at least one node, for reading a version number of the latched at least one node on the search path and for comparing the latched at least one node to the read version number of the latched at least one node. Concurrency control unit 136 further can include program code for updating the at least one node when the read version number and the recorded version number are equal, for traversing a second single search path in a hierarchical arrangement of nodes of a data structure and recording a version number for each node in the search path, for determining that a key is to be added to the at least one node in the search path to be updated and for determining that a key is to be removed from the at least one node in the search path to be updated.

Figure 2:
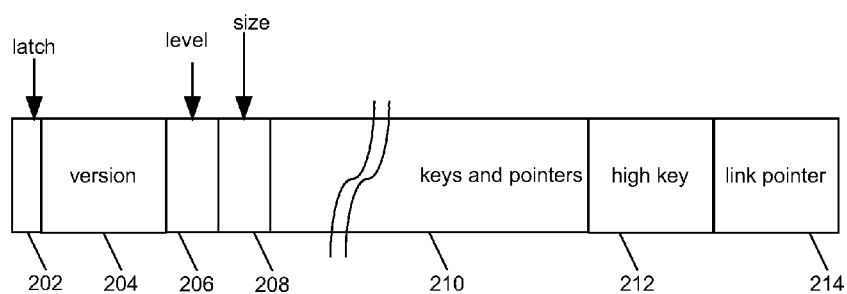
FIG. 2 is a schematic illustration of the structure of a B+-tree index node used by the optimistic traversal scheme according to an embodiment of the present invention.

In further illustration, FIG. 2 schematically shows the structure of a B+-tree index node used by the optimistic traversal scheme according to an embodiment of the present invention. Stored in each index node are node content information and concurrency control information. The node contents include keys and pointers to other nodes 210 for accessing the database. The concurrency control information includes a latch 202 for governing concurrent access to a node and a version number 204 for indicating the updated status of the node contents. The node contents further include a level 206 specifying the level number of the node in the tree index, a size 208 for specifying the number of entries in the node, a high key 212 and a link pointer 214. The high key of a node denotes the upper bound of the key values in the node, and the link pointer is a pointer pointing to the right sibling of the node at the same level. The link pointer provides an additional path for reaching a node, and the high key determines whether to follow the link pointer or not.

The concurrency control module 136 can include program code enabled upon execution in the memory of the host computer 130 to traverse a single search path in a hierarchical arrangement of nodes of a data structure and record a version number for each node in a search path into a memory register (e.g., register 1 of the host computer 130). Additionally, the program code of the concurrency control module 136 can identify at least one node in the search path to be updated. The program code of the concurrency control module 136 can latch the at least one node and can read a version number of the latched at least one node. The program code of he concurrency control module 136 can compare the version number of the latched at least one node to check if the at least one node's read version is different than the recorded node version stored in register 1. The program code of the concurrency control module 136 can update the at least one node when the read version number and the recorded version number are equal. Alternatively, the program code of the concurrency control module 136 further can cause the traversal of a second single search path in a hierarchical arrangement of nodes of a data structure and recording a version number for each node in the search path when, for example, there is a version mismatch, (i.e., when the read version number and the recorded version number are not equal). Moreover, the program code of the concurrency control module 136 can determine that a key is to be added to the node. Alternatively, the program code of the concurrency control module 136 can determine that a key is to be removed from the node. In embodiments, the program code of the concurrency control module 136 further can identify a child node in the search path in which a key is to be inserted, can latch the child node, read a version number of the latched child node, determine the read version number of the latched child node and the recorded version number of the latched child node are equal, determine an amount of freespace in the child node, determine that the amount of space needed to store the key to be inserted exceeds the amount of freespace in the child node, latch a parent node of the child node, read a version number of the latched parent node and determine that the read version number of the parent node and the recorded version of the parent node are equal.

Figure 3:
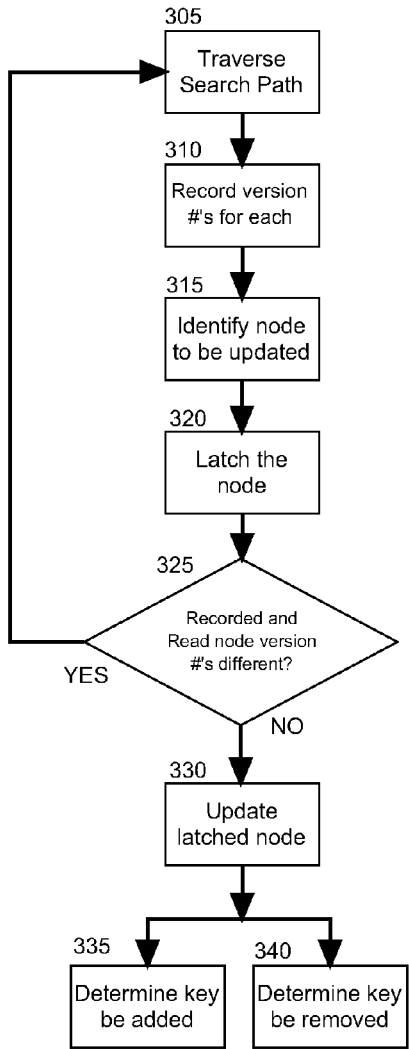
FIG. 3 is a flow chart illustrating a process for concurrency control in a hierarchical arrangement of nodes of a data structure.

In even yet further illustration of the operation of the concurrency control module 136, FIG. 3 is a flow chart illustrating a process for concurrency control in a hierarchical arrangement of nodes of a data structure. Beginning in block 305, a single search path in a hierarchical arrangement of nodes of a data structure can be traversed and a version number for each node in a search path can be recorded into a memory register (e.g., register 1 of the host computer 130) in block 310. In block 315, at least one node can be identified as to be updated and that at least one node can be latched in block 320. In decision block 325, a determination of whether the at least one node's read version number is different than the recorded node version stored in the memory register and if so, the traversal of the search path can be restarted in block 305. Otherwise, in block 330, the latched at least one node can be updated. Thereafter, in block 335, the concurrency control module 136 can determine that a key is to be added to the at least one node. Alternatively, in block 340, the concurrency control module 136 can determine that a key is to be removed.

Figure 4:
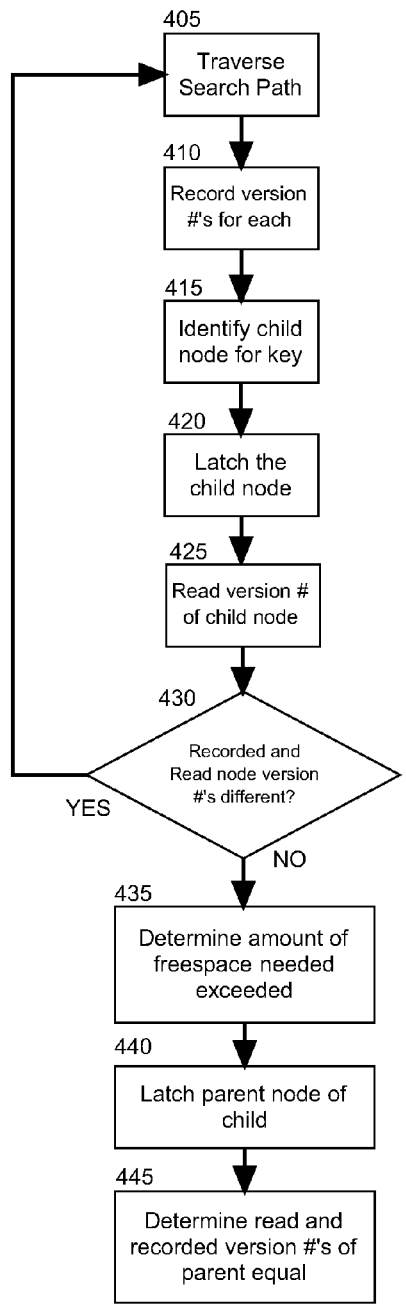
FIG. 4 is a flow chart illustrating another process for concurrency control in a hierarchical arrangement of nodes of a data structure.

In still even further illustration of the operation of the concurrency control module 136, FIG. 4 is a flow chart illustrating a process for concurrency control in a hierarchical arrangement of nodes of a data structure. Beginning in block 405, a single search path in a hierarchical arrangement of nodes of a data structure can be traversed and a version number for each node in a search path can be recorded into a memory register (e.g., register 1 of the host computer 130) in block 410. In block 415, a child node can be identified in which a key is to be inserted and that child node can be latched in block 420. In block 425, the version number of the child can be read. In decision block 430, a determination of whether the child node's read version number is different than the recorded node version stored in the memory register and if so, the traversal of the search path can be restarted in block 405. Otherwise, in block 435, concurrency control module 136 can determine that the amount of space needed to store the key to be inserted exceeds the amount of freespace in the child node. Thereafter, in block 440, a parent node of the child node can be latched. Finally, in block 445, the concurrency control module 136 can determine that the read version number of the parent node and the recorded version of the parent node are equal. In an embodiment, the process can further include splitting the latched child node into at least two child nodes, adding a pointer to a child node other than the latched child node and adding a link from the latched parent node to a child node other than the latched child node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A computer implemented concurrency control method, comprising:
   traversing a single search path in a hierarchical arrangement of nodes of a data structure and recording a version number for each node in the search path;
   identifying at least one node in the search path to be updated;
   latching the at least one node;
   reading a version number of the latched at least one node;
   comparing the recorded version number of the latched at least one node to the read version number of the latched at least one node; and
   updating the latched at least one node based on the comparison.

2. The method of claim 1, further comprising:
   updating the at least one node when the read version number and the recorded version number are equal.

3. The method of claim 1, further comprising:
   traversing a second single search path in a hierarchical arrangement of nodes of a data structure and recording a version number for each node in the search path.

4. The method of claim 1, wherein the identifying at least one node in the search path to be updated comprises determining that a key is to be added to the at least one node in the search path to be updated.

5. The method of claim 1, wherein the identifying at least one node in the search path to be updated comprises determining that a key is to be removed from the at least one node in the search path to be updated.

6. The method of claim 1, wherein the at least one node is a child node in which a key is to be inserted.

7. A computer implemented concurrency control method, comprising:
   traversing a single search path in a hierarchical arrangement of nodes of a data structure and recording a version number for each node in the search path;
   identifying at least one node in the search path to be updated, wherein the at least one node is a child node in which a key is to be inserted;
   latching the at least one node;
   reading a version number of the latched at least one node;
   comparing the recorded version number of the latched at least one node to the read version number of the latched at least one node;
   determining the read version number of the latched child node and the recorded version number of the latched child node are equal;
   determining an amount of freespace in the child node;
   determining that the amount of space needed to store the key to be inserted exceeds the amount of freespace in the child node;
   latching a parent node of the child node; and
   reading a version number of the latched parent node.

8. The method of claim 7, further comprising determining that the read version number of the parent node and the recorded version of the parent node are equal.

9. The method of claim 8, further comprising:
   splitting the latched child node into at least two child nodes; and
   updating the latched parent node by adding a pointer to a child node other than the latched child node into the latched parent node.

10. A computer program product for concurrency control in a hierarchical arrangement of nodes of a data structure, the computer program product comprising:
    a computer readable storage medium having computer readable program code embodied therewith, the computer readable program code comprising:
        computer readable program code for traversing a single search path in a hierarchical arrangement of nodes of a data structure and recording a version number for each node in the search path;
        computer readable program code for identifying at least one node in the search path to be updated;
        computer readable program code for latching the at least one node;
        computer readable program code for reading a version number of the latched at least one node; and
        computer readable program code for comparing the recorded version number of the latched at least one node to the read version number of the latched at least one node and updating the latched at least one node based on the comparison.

11. The computer program product of claim 10, further comprising:
    computer readable program code for updating the at least one node when the read version number and the recorded version number are equal.

12. The computer program product of claim 10, further comprising:
    computer readable program code for traversing a second single search path in a hierarchical arrangement of nodes of a data structure and recording a version number for each node in the search path.

13. The computer program product of claim 10, wherein the computer readable program code for identifying at least one node in the search path to be updated comprises computer readable program code for determining that a key is to be added to the node.

14. The computer program product of claim 10, wherein the computer readable program code for identifying at least one node in the search path to be updated comprises computer readable program code for determining that a key is to be removed from the node.

15. The computer program product of claim 10, wherein the at least one node is a child node in which a key is to be inserted.

16. A computer program product for concurrency control in a hierarchical arrangement of nodes of a data structure, the computer program product comprising:
    a computer readable storage medium having computer readable program code embodied therewith, the computer readable program code comprising:
        computer readable program code for traversing a single search path in a hierarchical arrangement of nodes of a data structure and recording a version number for each node in the search path;
        computer readable program code for identifying at least one node in the search path to be updated, wherein the at least one node is a child node in which a key is to be inserted;
        computer readable program code for latching the at least one node;

computer readable program code for reading a version number of the latched at least one node;

computer readable program code for comparing the recorded version number of the latched at least one node to the read version number of the latched at least one node;

computer readable program code for determining the read version number of the latched child node and the recorded version number of the latched child node are equal;

computer readable program code for determining an amount of freespace in the child node;

computer readable program code for determining that the amount of space needed to store the key to be inserted exceeds the amount of freespace in the child node;

computer readable program code for latching a parent node of the child node; and computer readable program code for reading a version number of the latched parent node.

17. The computer program product of claim 16, further comprising computer readable program code for determining that the read version number of the parent node and the recorded version of the parent node are equal.

18. The computer program product of claim 17, further comprising:

computer readable program code for splitting the latched child node into at least two child nodes; and computer readable program code for updating the latched parent node by adding a pointer to a child node other than the latched child node into the latched parent node.

19. A data processing system configured for concurrency control comprising:

a host computer with a processor and memory;

a query processing system executing in the host computer and monitoring queries of a database in a main memory; and a concurrency control module coupled to the query processing system, the concurrency control module comprising program code for traversing a single search path in a hierarchical arrangement of nodes of a data structure and recording a version number for each node in the search path, for identifying at least one node in the search path to be updated, for latching the at least one node, for reading a version number of the latched at least one node on the search path, for comparing the latched at least one node to the read version number of the latched at least one node, and for updating the latched at least one node based on the comparison.

20. The system of claim 19, wherein the program code of the concurrency control module is further enabled to update the at least one node when the read version number and the recorded version number are equal.

21. The system of claim 19, wherein the program code of the concurrency control module is further enabled to traverse a second single search path in a hierarchical arrangement of nodes of a data structure and record a version number for each node in the search path.

22. The system of claim 19, wherein the program code of the concurrency control module is further enabled to determine that a key is to be added to the at least one node in the search path to be updated.

23. The system of claim 19, wherein the program code of the concurrency control module is further enabled to determine that a key is to be removed from the at least one node in the search path to be updated.

24. The system of claim 19, wherein the at least one node is a child node in which a key is to be inserted.

25. A data processing system configured for concurrency control comprising:

a host computer with a processor and memory;

a query processing system executing in the host computer and monitoring queries of a database in a main memory; and a concurrency control module coupled to the query processing system, the concurrency control module comprising program code for traversing a single search path in a hierarchical arrangement of nodes of a data structure and recording a version number for each node in the search path, for identifying at least one node in the search path to be updated, wherein the at least one node is a child node in which a key is to be inserted, for latching the at least one node, for reading a version number of the latched at least one node on the search path and for comparing the latched at least one node to the read version number of the latched at least one node;

wherein the program code of the concurrency control module is further enabled to:

determine the read version number of the latched child node and the recorded version number of the latched child node are equal;

determine an amount of freespace in the child node;

determine that the amount of space needed to store the key to be inserted exceeds the amount of freespace in the child node;

latch a parent node of the child node; and read a version number of the latched parent node.

* * * * *